(12) United States Patent
Yao et al.

(10) Patent No.: US 8,533,875 B2
(45) Date of Patent: Sep. 17, 2013

(54) SHOWER FIXING SEAT WITH LCD

(75) Inventors: Hua Yao, Xiamen (CN); Xianguo Zou, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 140 days.

(21) Appl. No.: 13/127,064

(22) PCT Filed: Nov. 27, 2009

(86) PCT No.: PCT/CN2009/075169
§ 371 (c)(1),
(2), (4) Date: May 2, 2011

(87) PCT Pub. No.: WO2010/081352
PCT Pub. Date: Jul. 22, 2010

(65) Prior Publication Data
US 2011/0209782 A1 Sep. 1, 2011

(30) Foreign Application Priority Data
Jan. 14, 2009 (CN) ........................ 2009 2 0136387 U

(51) Int. Cl.
*A47K 3/00* (2006.01)
(52) U.S. Cl.
USPC .............................................................. 4/615
(58) Field of Classification Search
USPC .............................................................. 4/615
See application file for complete search history.

(56) References Cited

U.S. PATENT DOCUMENTS
2009/0106891 A1 4/2009 Klicpera

FOREIGN PATENT DOCUMENTS

| CN | 2500393 Y | 7/2002 |
|---|---|---|
| CN | 2770792 Y | 4/2006 |
| CN | 2873057 Y | 2/2007 |
| CN | 200970559 Y | 11/2007 |
| CN | 200994746 Y | 12/2007 |
| CN | 201120326 Y | 9/2008 |
| CN | 201143458 Y | 11/2008 |
| CN | 201150886 Y | 11/2008 |
| CN | 201260993 Y | 6/2009 |
| CN | 201316682 Y | 9/2009 |
| CN | 201350425 Y | 11/2009 |
| CN | 201350433 Y | 11/2009 |

*Primary Examiner* — Lori Baker
(74) *Attorney, Agent, or Firm* — Rabin & Berdo, P.C.

(57) ABSTRACT

Shower fixing seat with LCD has a fixing seat fixed on the front end of its main body. The rear end of the main body is a water inlet connected with a water supply pipe. The lower end of the main body is a water outlet connected with the flexible pipe of the shower head. A hydroelectric device and a thermistance are disposed in the main body. A display module connected with one side of the main body has a circuit board and an LCD screen which are electrically connected to the hydroelectric device and the thermistance. When water flows into the main body, the hydroelectric device supplies power for the display module, and the thermistance transmits the temperature information to the display module so that the temperature is shown on the LCD screen. The shower fixing seat shows the shower outflow temperature.

8 Claims, 4 Drawing Sheets

SHOWER FIXING SEAT WITH LCD

FIELD OF THE INVENTION

The present invention relates to a sanitary ware, especially relates to a shower fixing seat with LCD.

BACKGROUND OF THE INVENTION

The shower is applied for bath, so the outflow temperature of the shower will directly determine whether the bath is comfortable or not. Generally, when the user takes a bath, he needs to continuously adjust the outflow temperature and feel the water with his body, until the temperature is suitable for shower. However, there are some shortages in the conventional technique, it is difficult for the user to estimate the outflow temperature at the first adjustment, so he may be hurt by the hot outflow, or feel quite uncomfortable if the outflow water is too cold. In order to solve the above shortage, people equip a LCD screen on the shower main body for illustrating the outflow temperature. However, the LCD screen is usually disposed on the rear portion of the shower main body or on the shower handle, and the size of the LCD screen is small, it is inconvenient for the user to know the outflow temperature.

SUMMARY OF THE INVENTION

The object of the present invention is to provide a shower fixing seat with LCD, wherein the temperature of the outflow water will be directly and clearly showed.

The technical solution of the present invention is:

Shower fixing seat with LCD, which comprises a main body and a fixing seat fixed on the front end of the main body, the shower is movably inserted in said fixing seat, the rear end of said main body is a water inlet connected with the water supply pipe, while the lower end of the main body is a water outlet connected with the flexible pipe of the shower head, a hydroelectric device and a thermistance are disposed in said main body; a display module is connected with one side of the main body, said display module comprises a circuit board and a LCD screen; the circuit board and the LCD screen are electrically connected with the hydroelectric device and the thermistance in the main body with wire.

Said hydroelectric device comprises a generator coil, a magnet and an impeller which can drive the magnet rotate.

An inclined water body is disposed on the water inlet of the main body for adjusting water flow.

A pivot hole is disposed on one side of the main body for pivoting the display module.

Said display module comprises a circuit board, a LCD screen, a window lens and a housing, a pivot seat is formed on the rear portion of the housing, a window for fixing the window lens is formed under the housing, the LCD screen and the circuit board are sequentially disposed behind the window lens and in the housing.

Said main body is pivoted with the display module by a hollow pivot.

After applying the present technical solution, the present invention promotes the temperature display manner of the conventional water outlet device, and equips display module outside of the shower fixing seat which can be applied as a joint, so the outflow water temperature will be directly and clearly showed on the display module. When the water flows into the fixing seat main body, the hydroelectric device will supply power to the circuit board and the LCD screen, while the thermistance will transmit the temperature parameter to the circuit board, then the circuit board will transmit the temperature parameter to the LCD screen, therefore the outflow temperature will be illustrated on the LCD screen, since the display module is disposed outside of the shower main body, so the user can clearly observe the displaying temperature. Furthermore, since said display module is movably pivoted with the main body, so the display module can rotate relative to the main body, and it will be convenient for the user to adjust the observation angle.

DETAILED DESCRIPTION OF THE EMBODIMENTS

Figure 1:
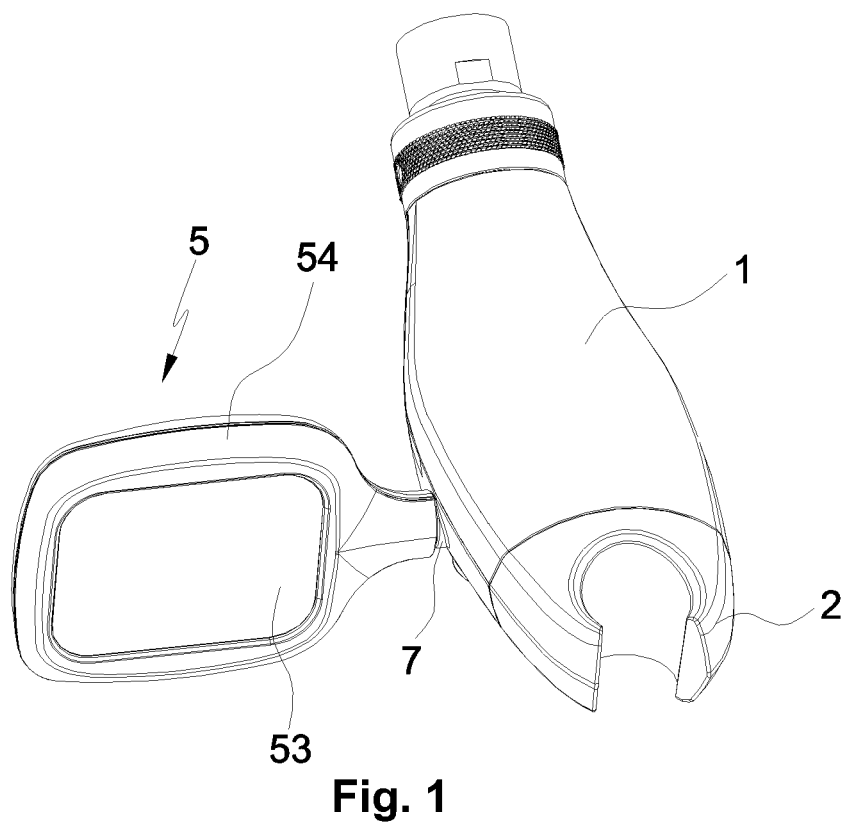
FIG. 1 is the perspective view of the present invention.
Figure 2:
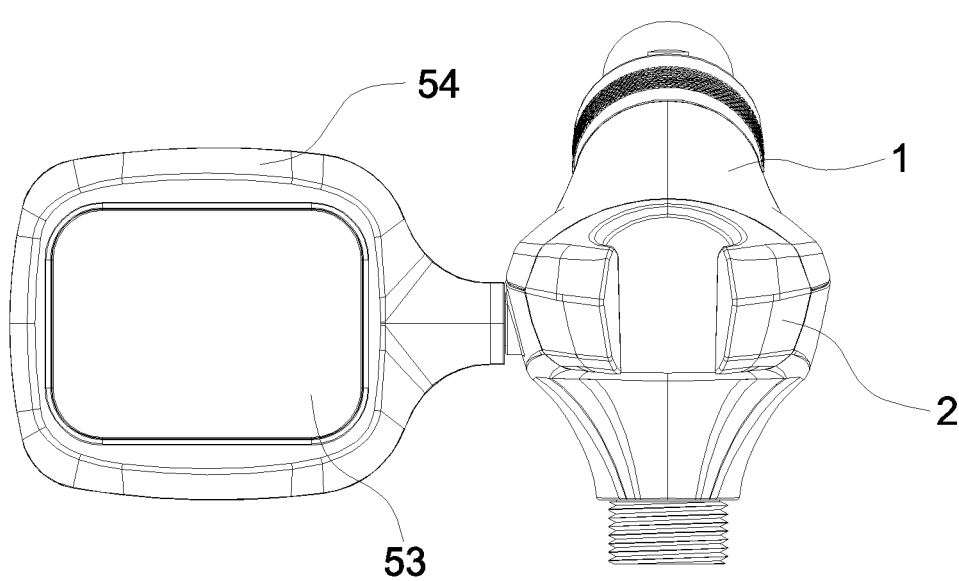
FIG. 2 is the front view of the present invention.
Figure 3:
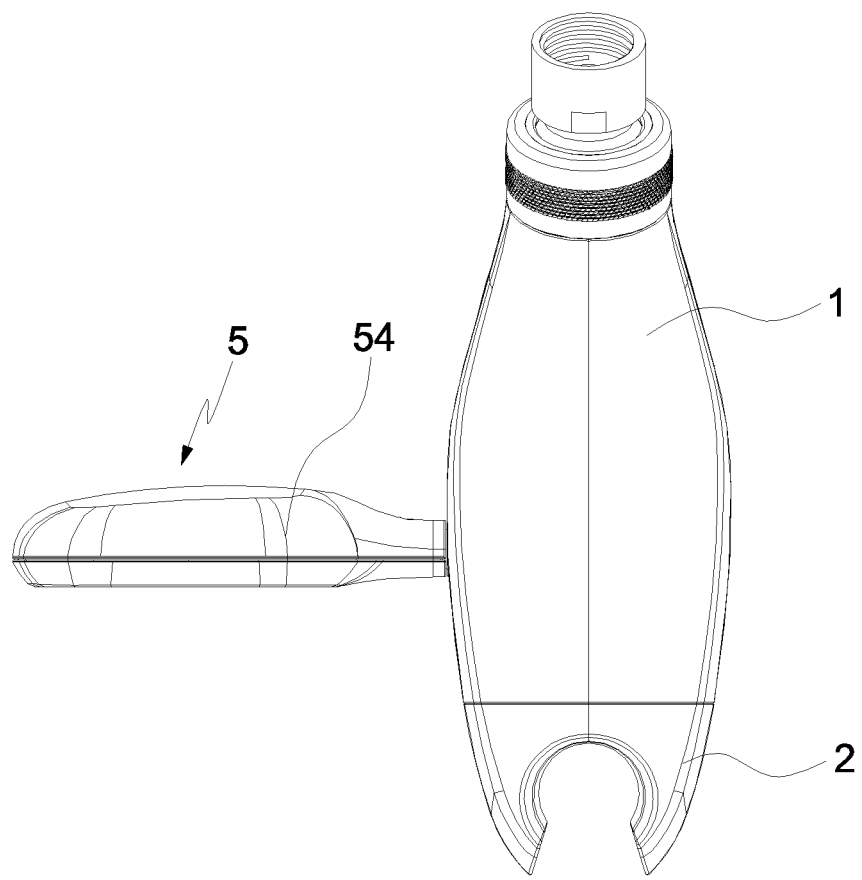
FIG. 3 is the top view of the present invention.

The shower fixing seat with LCD of the present invention is showed in FIG. 1 to FIG. 5, said fixing seat comprises a main body 1 and a fixing seat 2 fixed on the front end of the main body 1, the shower A is movably inserted in said fixing seat 2, the key technical features of the present invention are: the rear end of said main body is a water inlet connecting with a water supply pipe B, while the lower end of the main body 1 is a water outlet connecting with the flexible pipe 3 of the shower head, a hydroelectric device 4 is disposed in the main body 1, a display module 5 is connected with one side of the main body 1.

Figure 4:
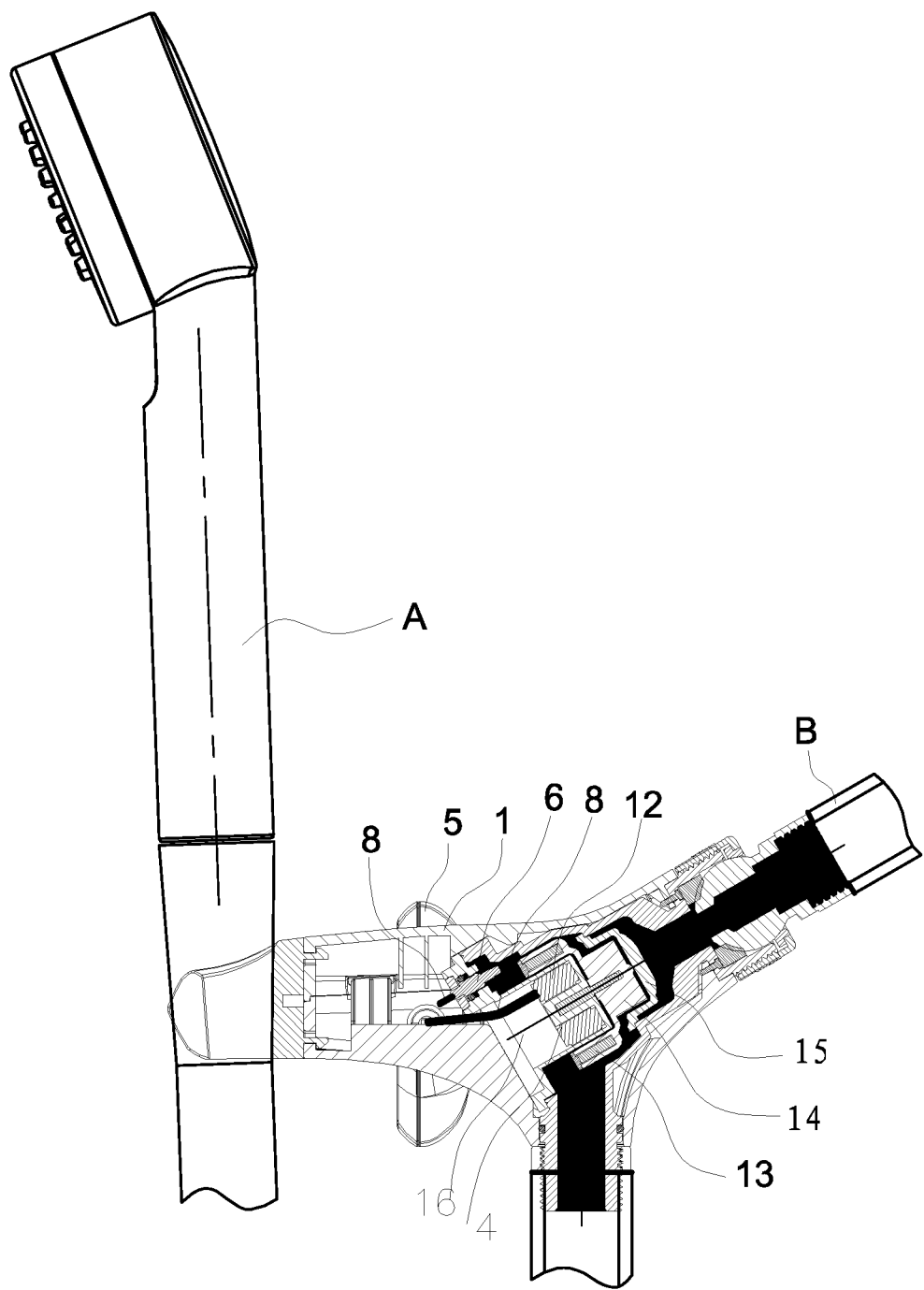
FIG. 4 is the structural view of the present invention.
Figure 5:
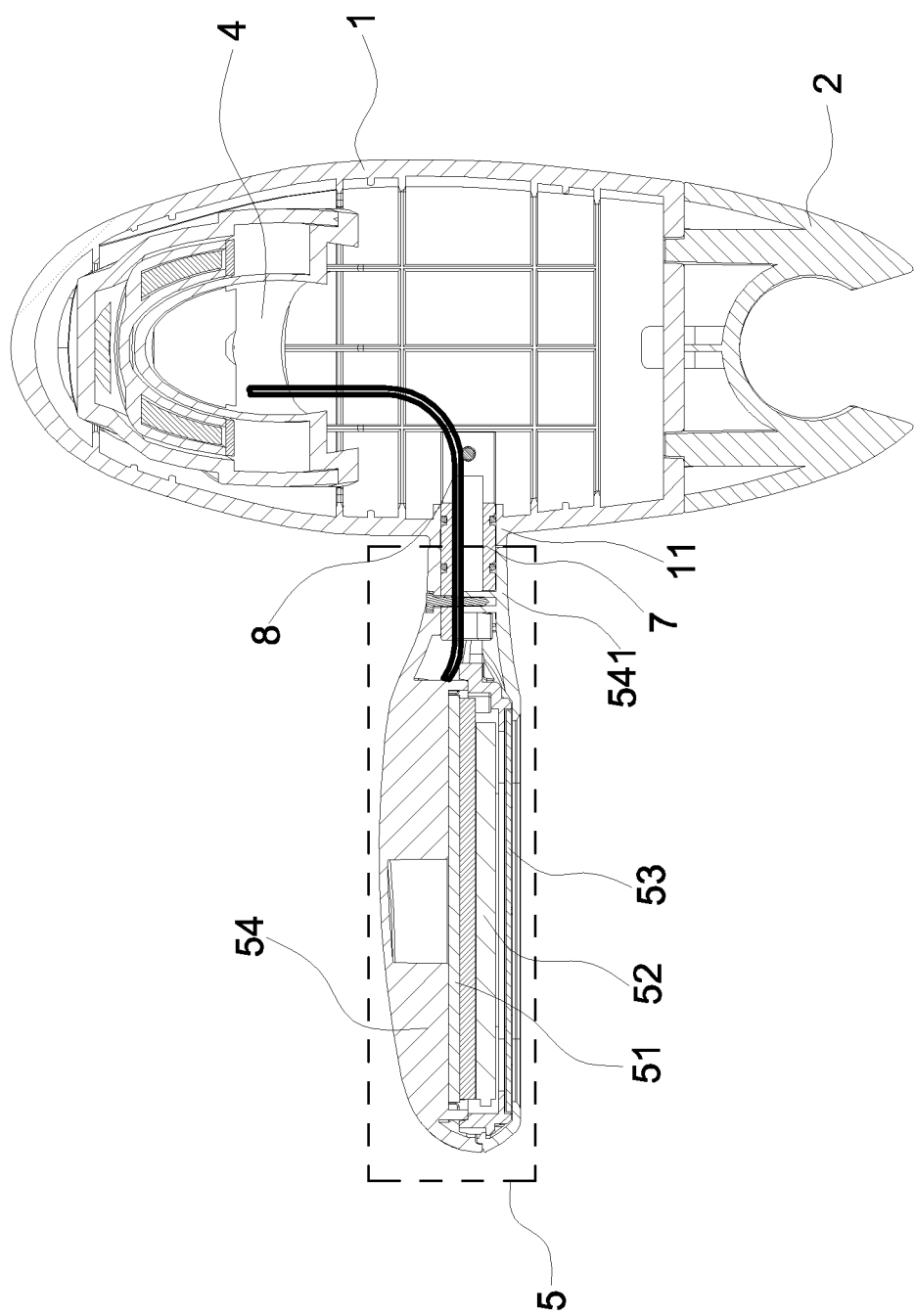
FIG. 5 is the structural view of the present invention during the operation status.

Please refer to FIG. 4 and FIG. 5, the inside the main body 1 is a Y-shaped chamber 16, the hydroelectric device 4 is disposed in the center of the Y-shaped chamber 16; an inclined water body 15 is disposed on the water inlet of the main body, a generator coil 12 is disposed under the inclined water body 15, a magnet 13 is arranged on the outer periphery of the coil 12, the magnet 13 is installed in the impeller 14, so the hydroelectric device 4 is formed. The flexible pipe 3 of the shower connecting with the water outlet of the main body 1 is disposed under the hydroelectric device 4, a thermistance 6 is disposed in the water flow pipeline of the main body 1 and electrically connected with the hydroelectric device 4 and the display module 5.

A pivot hole 11 for pivoting the display module 5 is disposed on one side of the main body 1.

Said display module 5 mainly comprises a circuit board 51, a LCD screen 52, a window lens 53 and a housing 54, a pivot seat 541 is formed on the rear portion of the housing 54, a window for fixing the window lens 53 is formed on the lower portion of the housing 54, the LCD screen 52 and the circuit board 51 are sequentially disposed on the rear portion of the window lens 53 and in the housing 54.

The two ends of the hollow pivot shaft 7 are respectively fixed in the pivot hole 11 of the fixing seat main body 1 and the pivot seat 541 of the housing 54, so the display module 5 is movably pivoted with the main body 1, and the wire 8 for the circuit board 51, the LCD screen 52, the hydroelectric device 4 and the thermistance 6 passes through the hollow pivot shaft 7 for electric connection.

After the water flows into the fixing seat main body 1, the inclined water body 15 will adjust the water flow direction, then the adjusted water will exert a sideway impact force to the impeller 14, the impeller 14 will be driven to rotate, the magnet 13 disposed inside the impeller 14 will rotate relative to the coil 12 along with the impeller 14 and cut the magnetic lines, so induced electromotive force will be generated on the coil 12 and led out by the wire 8, thus electric current will be generated in the circuit board loop for supplying the power to the circuit board 51 and the LCD screen 52. Since the resistance of the thermistance 6 will change according to the temperature change of the water flow, the change is identified by the software, the thermistance 6 is connected with the circuit board 51 through the wire 8, so the temperature will be illustrated on the LCD screen 52 correspondingly. Therefore when the user opens the water supply switch for shower, the outflow temperature will be directly showed on the display module 5 outside of the fixing seat main body 1. The present invention effectively applies the shower fixing seat, and the size of the LCD screen 52 can be designed relatively large since the display module 5 is connected outside of the shower main body, so the user can clearly observe the outflow temperature of the shower head; said display module 5 is movably pivoted with the main body 1, so the display module 5 can rotate relative to the main body 1, so it is convenient for the user to adjust the viewing angle. In conclusion, the present invention promotes the temperature display manner of the conventional water outlet device, and applies the shower fixing seat for directly and clearly illustrates the outflow temperature of the shower head.

INDUSTRIAL APPLICABILITY

The present invention discloses a shower fixing seat with LCD, which applies its own hydroelectric device for power supply, the outflow temperature of the shower is legibly showed, the structure is simple, the operation is convenient. It has a good industrial applicability.

What is claimed is:

1. A shower fixing seat with an LCD, comprising:
   a fixing seat, a shower being movably insertable in said fixing seat;
   a main body having said fixing seat fixed on a front end thereof, a rear end of said main body being a water inlet connectable with a water supply pipe, a lower end of the main body being a water outlet connectable with a flexible pipe of a shower head;
   a hydroelectric device and a thermistance disposed in said main body; and
   a display module connected with one side of the main body, said display module comprising a circuit board and an LCD screen, the circuit board and the LCD screen being electrically connected with the hydroelectric device and the thermistance in the main body with a wire.

2. The shower fixing seat with an LCD according to claim 1, wherein said hydroelectric device comprises a generator coil, a magnet, and an impeller which drives the magnet to rotate.

3. The shower fixing seat with an LCD according to claim 1, wherein an inclined water body is disposed at the water inlet of the main body for adjusting a water flow.

4. The shower fixing seat with an LCD according to claim 3, wherein the magnet is disposed around an outer periphery of the generator coil, the generator coil and the magnet being disposed under the inclined water body, the magnet being disposed in the impeller; wherein the water flow exerts a sideway impact force to the impeller after being adjusted by the inclined water body to drive the impeller to rotate, so that the magnet cuts magnetic lines when the impeller rotates relative to the generator coil, to generate induced electromotive force on the coil and led out by the wire, thus electric current will be generated in a circuit board loop for supplying power to the circuit board and the LCD screen.

5. The shower fixing seat with an LCD according to claim 4, wherein an inside of the main body is a Y-shaped chamber, the hydroelectric device being disposed in a middle of the Y-shaped chamber.

6. The shower fixing seat with an LCD according to claim 1, wherein a pivot hole is disposed on one side of the main body for pivoting the display module.

7. The shower fixing seat with an LCD according to claim 1, wherein the display module further comprises a window lens and a housing, a pivot seat being formed on a rear portion of the housing, a window for fixing the window lens being formed under the housing, the LCD screen and the circuit board being sequentially disposed behind the window lens and in the housing.

8. The shower fixing seat with an LCD according to claim 1, wherein the main body is pivoted with the display module by a hollow pivot.

* * * * *